Dec. 12, 1950   C. H. HOLMES ET AL   2,533,936
AQUARIUM AERATOR
Filed Nov. 3, 1948   2 Sheets-Sheet 2
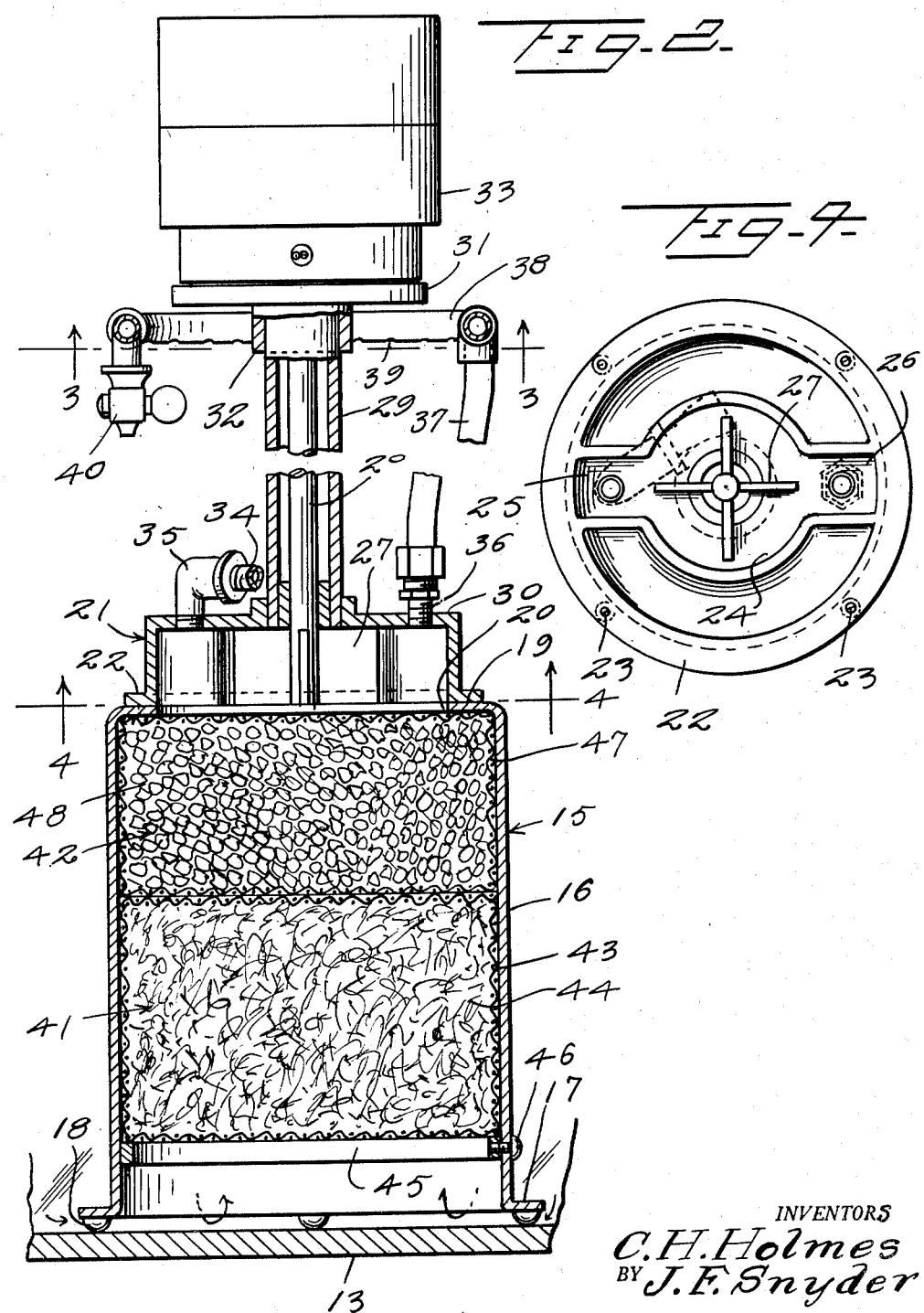
INVENTORS
C.H. Holmes
BY J.F. Snyder
Kimmel & Crowell Attys.

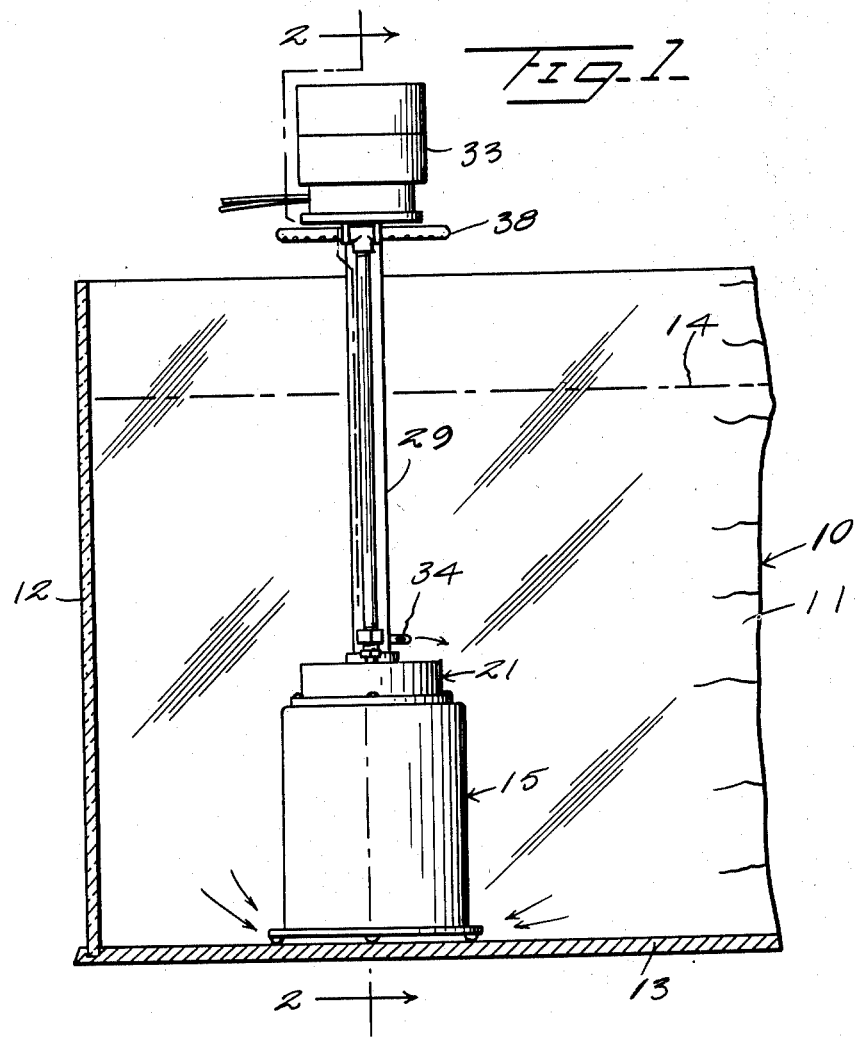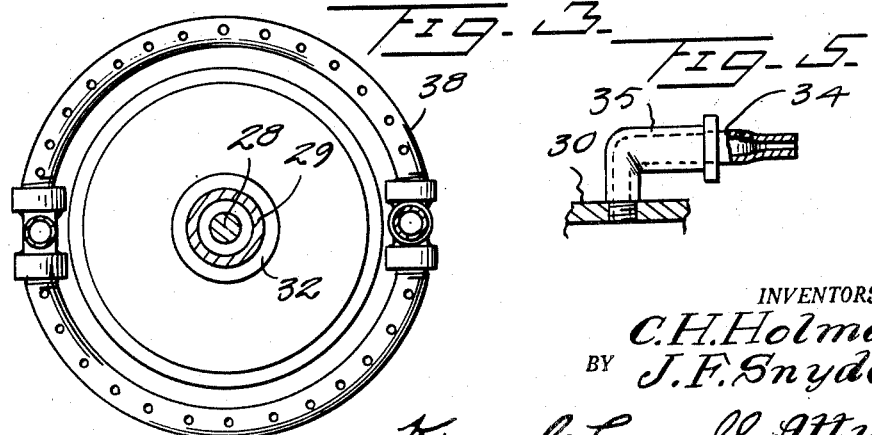

Patented Dec. 12, 1950

2,533,936

UNITED STATES PATENT OFFICE 2,533,936

AQUARIUM AERATOR

Charles H. Holmes and James L. Snyder, Chicago, Ill., assignors to H. O. Kesler and I. G. Merner, both of Chicago, Ill.

Application November 3, 1948, Serial No. 58,104

3 Claims. (Cl. 210—16)

This invention relates to a combined aerator, water circulator and filter for aquariums.

An object of this invention is to provide a device for mounting in an aquarium which will eliminate the necessity for constantly changing water in an aquarium, such as a commercial aquarium, and which will permit the placement of an excess number of fish in the water, while at the same time maintaining an air or oxygen supply in the water so as to sustain the fish.

Another object of this invention is to provide an aerator of this kind which will circulate the water in the tank and at the same time will filter the water so that the main body of water will be relatively clear and clean, and it will not be necessary to renew the water frequently or provide for constant inflow of the water.

With the above and other objects in view, my invention consists in the arrangement, combination and details of construction disclosed in the drawings and specification, and then more particularly pointed out in the appended claims.

In the drawings,

Figure 1 is a detail side elevation of an aquarium aerator and circulator constructed according to an embodiment of this invention, showing the device mounted in an aquarium with the latter broken away and in vertical section, Figure 2 is a fragmentary sectional view taken on the line 2—2 of Figure 1, Figure 3 is a sectional view taken on the line 3—3 of Figure 2, Figure 4 is a sectional view taken on the line 4—4 of Figure 2; and Figure 5 is a fragmentary sectional view showing the circulator nozzle associated with this device.

Referring to the drawings, the numeral 10 designates generally an aquarium of conventional construction formed with vertical side walls 11, end walls 12, and a bottom wall 13. In order to provide a means whereby the water in the aquarium or tank 10, which is disposed at substantially the level indicated by the numeral 14 will be constantly aerated, circulated and filtered, I have provided a housing generally designated as 15 which is mounted on the bottom wall 13.

The housing 15 is formed of a cylindrical side wall 16 having an outwardly extending base flange 17 to which rubber feet 18 are adapted to be secured so that the open lower end of the housing 15 will be disposed above the surface of the bottom wall 13 to provide for intake of water from the tank through the housing 15.

The housing 15 includes a top wall 19 having a relatively large central opening 20, and a pump housing 21 is mounted on the top wall 19. The pump housing 21 includes an annular flange 22 secured by fastening means 23 to the top wall 19, and the pump housing 21 is formed with a centrally disposed pump chamber 24 having diametrically opposed outlet chambers 25 and 26. The lower side of the housing 21 is open so that water may be drawn upwardly through the chamber 24 and then discharged laterally into the discharge chambers 25 and 26.

A centrifugal blade structure 27 is disposed in the chamber 24, being secured to a vertical drive shaft 28 which extends upwardly through a tubular supporting member 29 which is fixed to the top wall 30 of the pump housing 21. The tubular supporting member 29 has fixed to the upper end thereof a motor supporting plate 31 having a bushing 32 which is disposed about the upper end of the supporting member 29.

A motor 33 is mounted on the plate 31 and connected to the shaft 28 so that operation of the motor 33 will rotate the blades 27 and provide for discharge of water into the discharge chambers 25 and 26.

A circulating nozzle 34 is carried by an L-shaped supporting member 35 in the form of a conventional L which is secured to the top wall 30 of the housing 21 and communicates with the discharge chamber 25. A nipple 36 is threaded into the top wall 30, communicating with the discharge chamber 26, and an upwardly extending pipe 37 is connected with the nipple 36 and is connected at its upper end to a tubular ring 38 disposed closely adjacent the motor supporting plate 31.

The ring 38 is formed with a plurality of discharge openings 39 in the lower side thereof so that the water in the ring 38 may be discharged as jets downwardly into the water in the tank 10. A manually operable pet cock 40 is connected with the jet ring 38, discharging downwardly so that excess water in the ring 38 will be discharged from a single nozzle downwardly into the tank 10.

The water which is drawn upwardly into the housing 15 is adapted to be filtered by means of a pair of filter members generally designated as 41 and 42. The filter member 41 includes a perforate jacket 43 in the form of a screen or the like, within which is mounted a mass of fibrous material 44. The fibrous material may either be wood fibers, such as shavings, sawdust, or may be metal fibers. The filter member 41 is the lower filter member and is removably mounted in the housing 15 by means of a holding ring 45 which is secured within the lower portion of the housing 15 by fastening means 46. The filter member 42, which is the upper filter member, includes a perforate jacket 47 in the form of screen or the like, within which is mounted charcoal 48. The upper filter member 42 is supported by the lower filter member 41.

In the use and operation of this device the housing 15 which constitutes the base of the device is mounted within the tank 10, resting on the bottom 13. When the motor 33 is operated, the pump will draw water upwardly through the housing 15 and as the water passes upwardly through the housing 15, the water will pass through the two filter members 41 and 42. A portion of the water which is centrifugally discharged from the pumping chamber 24 will be discharged into chamber 25 and from this chamber the water will be discharged as circulating water through the circulating nozzle or jet 34. The jet 34 is positioned at a relatively low position within the water so that there will be an active movement of the water from a point below the upper level thereof. At the same time that water is being discharged from the circulating nozzle 34, water will be forced upwardly from chamber 26 into the jet ring 38. The water in ring 38 will be discharged as a series of fine jets through the jet openings 39. This water will be discharged above the level 14 of the water in the tank so as to cause a very substantial amount of air to be mixed with the water.

With a combined aerator, circulator and filter as hereinbefore described, it is not necessary in a commercial aquarium where an excessive quantity of fish are disposed in the tank to provide a constant flow of water from a supply source and to provide for the overflow of such water. In this manner the water in the tank 10 will be at a constant temperature so that the fish will not be subjected to differently tempered water which has a tendency to cause the fish to die, and furthermore by providing the aeration of the water in the tank 10, sufficient oxygen will be provided in the water to provide for normal breathing of the fish.

We do not mean to confine ourselves to the exact details of construction herein disclosed but claim all variations falling within the purview of the appended claims.

What we claim is:
1. An aquarium aerator comprising a hollow base open at the bottom and adapted for mounting within an aquarium, a filter member in said base, a pump carried by said base having the suction side thereof communicating with said base above said filter member, a motor connected to said pump, means supporting said motor above said pump and above the water in the aquarium, a circulating nozzle connected to the discharge side of said pump, and an apertured jet member connected with the outlet side of said pump whereby to discharge water in jet form into the water in the aquarium.

2. An aquarium aerator and filter comprising a hollow downwardly opening base, means supporting the bottom end of said base in spaced relation to the bottom of the aquarium, a filter member extending across the interior of said base, a pump mounted on said base with the suction side of said pump communicating with the latter above said filter member, an operator for said pump, a circulating nozzle connected to the discharge side of said pump, a tubular ring connected to the discharge side of said pump, and a plurality of spaced jet nozzles formed in said ring for discharging a fine spray into the water in the aquarium to procure the aeration of the water.

3. An aquarium aerator and filter as set forth in claim 2, wherein a valved outlet of relatively large capacity is connected to said tubular ring for controlling the discharge of water through said jet nozzles to thereby regulate the oxygen content in the water in the aquarium.

CHARLES H. HOLMES.
JAMES L. SNYDER.

REFERENCES CITED

The following references are of record in the file of this patent:

UNITED STATES PATENTS

| Number | Name | Date |
|---|---|---|
| 1,734,011 | Harrison | Oct. 29, 1929 |
| 2,137,397 | Haldeman | Nov. 22, 1938 |
| 2,194,037 | Thuma | Mar. 19, 1940 |
| 2,275,428 | Haldeman | Mar. 10, 1942 |
| 2,425,372 | Green | Aug. 12, 1947 |